United States Patent [19]

Zimmermann

[11] Patent Number: 4,850,672
[45] Date of Patent: Jul. 25, 1989

[54] STRAIN COMPENSATED FIBER OPTIC CABLE

[75] Inventor: Bernd D. Zimmermann, Hickory, N.C.

[73] Assignee: Siecor Corporation, Hickory, N.C.

[21] Appl. No.: 157,592

[22] Filed: Feb. 19, 1988

[51] Int. Cl.$^4$ .............................................. G02B 6/44
[52] U.S. Cl. ............................... 350/96.23; 174/11 R; 174/24
[58] Field of Search ............. 350/96.23; 174/24, 11 R

[56] References Cited

U.S. PATENT DOCUMENTS

| 3,845,233 | 10/1974 | Burton | 174/24 |
| 4,596,443 | 6/1986 | Diemeer et al. | 350/96.23 |
| 4,738,504 | 4/1988 | Jones | 350/96.23 |
| 4,743,085 | 5/1988 | Jenkins et al. | 350/96.23 |

FOREIGN PATENT DOCUMENTS

| 0104846 | 8/1979 | Japan | 350/96.23 |
| 0135805 | 10/1981 | Japan | 350/96.23 |
| 0090603 | 6/1982 | Japan | 350/96.23 |
| 0080605 | 5/1983 | Japan | 350/96.23 |
| 0182403 | 10/1984 | Japan | 350/96.23 |
| 1236511 | 10/1986 | Japan | 350/96.23 |

OTHER PUBLICATIONS

Bark et al., "Stress-Strain—Fiber Cables"; pp. 385-390; Proceedings of the 28th International Wire and Cable Symposium; 1979.
Timoshenko et al.; "Theory of Elasticity"; pp. 53-71; 2nd ed., 1951.

Primary Examiner—William L. Sikes
Assistant Examiner—Xuan Thi Vo
Attorney, Agent, or Firm—Roy B. Moffitt

[57] ABSTRACT

A strain compensated fiber optic cable composed of a hollow central member made from an elastic material capable of being physically enlarged, such enlargement capable of being at least partially reversed upon demand; and, a plurality of optical fibers having a first pitch diameter disposed, either in the sidewall of the central member, or on the outermost surface of the central member, so that upon enlargement of the central member, the first pitch diameter of the optical fiber can be changed to a second pitch diameter and upon reversal of the enlargement, the second pitch diameter can be changed to either the first pitch diameter or another pitch diameter.

7 Claims, 1 Drawing Sheet

STRAIN COMPENSATED FIBER OPTIC CABLE

BACKGROUND OF THE INVENTION

As a general rule, fiber optic cables are designed as either loose tube, composite buffer, or tight buffered type cables. All three types include some mechanism with which the optical fiber strain is minimized or eliminated as the cable is exposed to high or low temperature extremes. Loose tube and composite buffered type cables employ what is referred to as a strain-free window principal. This principal allows free movement of the optical fiber under the buffer material. These cables are, at least in some few instances, difficult to handle due to the filling compound involved. On the other hand, tight buffered type cables do not include filling compounds, but rely upon the mechanical attachment of the tight buffer fibers with a elongated anti-buckling element such as a glass-reinforced rod. This combination minimizes cable contraction and elongation at temperature extremes.

In view of the above, it is desirable to create a fiber optic cable design which (a) does not include or rely upon filling compound and movement between the optical fiber in the buffer as a result of such filling compound and (b) does not require any buckling members. Such cable would be smaller and more flexible than conventional fiber optic cable. In addition, it would be desirable that such cable have some mechanism to exclude water from entering the cable structure, especially in light of the fact that filling compounds would be eliminated.

SUMMARY OF THE INVENTION

The invention is a fiber optic cable composed of a hollow core, fibers stranded around or in the core, and an outer jacket protecting the optical fibers. The hollow core may be pressurized at lower temperatures using air or other convenient fluid, to achieve an increase in fiber pitch diameter and core length of the core. Such increases compensate for the compression of the cable at low temperatures. At high temperatures, or cable elongation, the core is depressurized to decrease the pitch diameter of the optical fiber and cable length. As more fully explained hereafter, models which can determine the needed increase or decrease in pitch diameter to maintain the fiber strain free can be derived from loose tube cabling theory such as that spelled out in the following reference: "Stress-Strain Behavior of Optical Fiber Cables", Bark et al, Proceedings of the 28th International Wire and Cable Symposium, pp. 385-390 (1979), the contents of which are included herein by express reference. Elasticity models, which can be used to determine the pressure needed to obtain a given radial expansion or compression of the cable core can be derived from the following publication: "Theory of Elasticity", S. Timoshenko, J. N. Goodier, 2nd Ed., 1951, pp. 55-68, the contents of which are included herein by express reference. A specific example of how these models can be and is used to determine pressure needed to obtain a certain radial expansion or compression of the cable core set forth in the Detailed Description of the Invention.

DETAILED DESCRIPTION OF THE INVENTION

Figure 1:
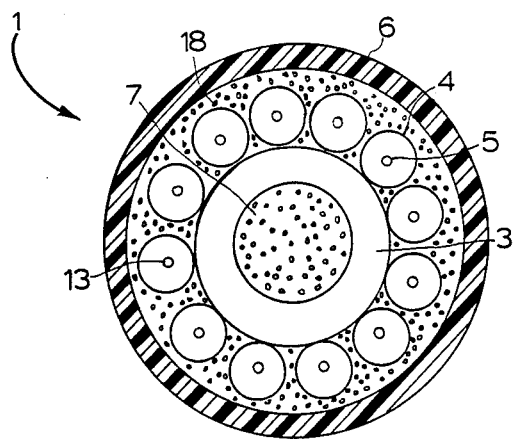
FIG. 1 is a cross section of one embodiment of a fiber optic cable of the invention, having buffered optical fibers stranded around a hollow central member.

Shown as element 1 and in FIG. 1, is a cross-section of one embodiment of the invention, composed of a hollow central member 3 which forms a elongated passageway 7. On the outermost surface of the hollow central member 3 is disposed a plurality of buffered optical glass fibers, represented by glass fiber 5 and buffering element 4. Circumscribing the buffered glass fibers is plastic jacket 6. In between plastic jacket 6 and cross central member 3, there may be disposed fibers 18, such as aramid fibers that act as a strength member.

Figure 2:
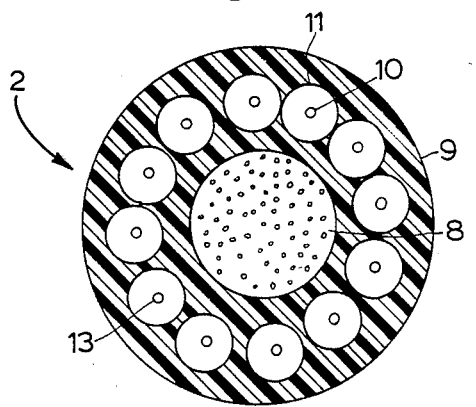
FIG. 2 is a cross section of another embodiment of a fiber optic cable of the invention, namely a jacketed cable with a hollow core.

Shown by element 2 in FIG. 2, is a cross-section of another embodiment of the fiber optic cable of the invention. This embodiment includes plastic tubular-shaped member 9 delimiting an elongated passage 8. In the wall of hollow central member 9 is disposed a plurality of buffered optical fibers, the optical fibers being represented by element 10 and the buffering around such fibers being represented by element 11. There may also be distributed in the wall of hollow central member 9, a plurality of fibers that act as a strength member such as aramid fibers 18. The same aramid fiber strength member may also be disposed in the hollow central member 3. Furthermore, aramid fibers 18 in both elements 1 and 2 of embodiments 1 and 2 may be disposed in hollow core 7 and 8 respectively instead.

As an example, hollow core members 3 and 9, as well as the plastic used as a buffering mechanism shown as elements 4 and 11 may possess the following properties:

(a) A low (less than 7000 psi) tensile modulus;

(b) The tensile modulus referred to in (a) should remain relative constant across the cable's operating temperature range, for example $-40°$ C. to $+70°$ C.; and, (c) The material must be adapted to be processed in a tube configuration, such as by extrusion.

Samples of materials which satisfy the above requirements include, but are not limited to, heat or UV curable silicone elastomers, thermoplastic elastomers, and rubbers such as polyurethane block copolymers and styrene/elastomer block copolymers; and, foamed thermoplastic materials such as foamed polyvinylchloride.

Pressure, P required to expand a given tube containing helically stranded fibers thereabouts, such as those shown in FIGS. 1 and 2, can be found from the following formula.

$$P = \frac{\frac{(E)}{(r)} \frac{(b^2 - a^2)}{(a^2)} \Delta r}{[(1 + b^2/r^2) - \nu(1 - b^2/r^2)]} \quad (1)$$

where:

E = Young's Modulus of Tube Material r = Radial Position of Optical Fibers from center of central member b=½ the Tube Outer Diameter
a=½ the Tube Inner Diameter
(Δr)=Radial Displacement of Optical Fiber at position of r
v=Poisson's ratio of tube material Δr, is an amount a fiber moves radially from a first to a second position upon increase of pressure and upon decrease of the pressure from a second back to the first position.

Fiber optic cables such as that shown by elements 1 and 2, are expected to operate over the temperature range of −40° to 70° C. Thus it is to be expected that the pitch diameter of the optical fibers will change upon expansion and contraction as the temperature is increased and decreased respectively. From traditional loose tube cabling theory, the change in pitch diameter, ΔD, required to maintain the helically stranded optical fibers strain free can be derived from the following formula:

$$\Delta D = \frac{-2D + \sqrt{4D^2 + 8\frac{(P^2 E)}{\pi^2}}}{2} \quad (2)$$

where:
D=Original Pitch Diameter
P=Stranding Laylength of Optical Fibers
E=Cable (or Tube) Contraction of Elongation The tube contraction or elongation, E, is given by:

$$E \approx \Delta T \alpha_{eff} \quad (3)$$

where:
ΔT=Change in Operating Temperature
α_eff=Effective Coefficient of Thermal Expansion for the Given Cable Construction By setting Δr of equation (1)=ΔD (from equation (2)), the required tube pressure P which will insure that the optical fibers remain strain free at ΔT degrees below or above room temperature, can be found through equation (1).

As an example of the foregoing: a 9 mm OD and 5 mm I.D. tube containing 50 125/250 micron optical fibers was exposed to temperatures as low as −20° C. The required pressure to avoid straining of the optical fibers was in the order of 100 to 200 psig, a pressure level that falls within a practical feasible range. The tube material in this example was silicon rubber.

Buffered fibers presented by elements 10-11 of element 2 and 4 and 5 of element 1 can either be tight buffered or composite buffered, but not of the loose tube variety.

Figure 3:
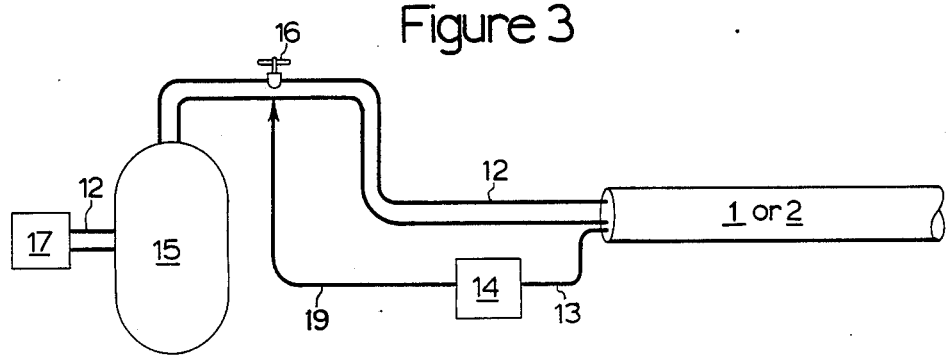
FIG. 3 is a schematic diagram of a communication system employing either one of the embodiments of the invention in a feedback compensator system.

A communication system employing either one of the embodiments shown by element 1 of FIG. 1, or element 2 of FIG. 2 is shown in FIG. 3. The elongated passageway 7 or 8 is in communication with a conduit 12 in which there is disposed control valve 16. Conduit 12 is also in communication with a pressurized tank 15, which is in further communication via conduit 12 with pump 17. Pressurized tank 15 contains a body of fluid (such as air or other suitable gas) and through the pump and the pressurized tank 15, the pressurized fluid is supplied to the elongated passageway 7 or 8. One of the fibers 13 of either elements 1 or 2 is designated as a control for monitoring fiber and is placed within the tube as if it were a transmission fiber, i.e., in the same manner as all other fibers in the cable construction. The type of fiber used as a monitoring or control fiber may be different, but does not necessarily have to be different with respect to the remaining fibers in the cable. It may be different in the sense it is more sensitive to the effects of fiber strain (microbending). However, if the cable were made up of data carrying fibers, which are expensive, it would not be practical to use one of such fibers as the control fiber 13. A lesser expensive fiber could be used instead.

As the temperature changes and the optical fibers of elements 1 and 2 are subject to contraction or expansion, the attenuation of control fiber 13 changes. This attenuation is detected by detector 14. In response to such attenuation change, detector 14 emits a signal through lead 19 to controllable valve 16. Controllable valve 16 is responsive to the signal emitted by detector regulator 14 to either increase or decrease the pressure in elongated passageway 7 or 8, depending on whether the temperature to which the pressurized fiber optic cable is being subjected rises or falls.

While illustrative embodiments of the subject invention have been described and illustrated, it is obvious that various changes and modifications can be made therein without departing from the spirit of the present invention, which should be limited only by the scope of the appended claims.

What is claimed is:
1. A fiber optic cable comprising:
   (a) a hollow central member having a wall, delimiting an elongated passageway, made from an elastic material capable of being enlarged and such enlargement capable of being at least partially reversed upon demand; and,
   (b) a plurality of optical fibers having a first pitch diameter disposed, either within the wall of the hollow central member or on the outermost surface of the hollow central member, so that upon enlargement of said central member, the first pitch diameter of the optical fiber can be changed to a second pitch diameter and upon reversal of said enlargement, the second pitch diameter can be changed to either the first pitch diameter or another pitch diameter.

2. The fiber optic cable of claim 1 further including a plastic jacket circumscribing the optical fibers.

3. The fiber otpic cable of claim 1 wherein said elongated passageway contains a fluid to bring about said enlargement and reversal thereof.

4. The fiber optic cable of claim 3 further including a pump and a body of fluid, at least part of said body of fluid disposed in said elongated passageway, said pump in communication with said body of fluid and said tubular passageway for raising and lowering the pressure therein sufficient to expand and reverse the expansion respectively of said tubular wall.

5. The fiber optic cable of claim 4 further including a detector, attached to at least one of said plurality of optical fibers, responsive to a change in attenuation of the optical fiber to which it is attached to emit a signal in proportion to said attenuation change, and a control valve connected to the detector and disposed between said pump and said elongated passageway, for controlling the pressure of fluid in said passageway, and responsive to said signal emitted from said detector.

6. The fiber optic cable of claim 1 further including at least one elongated strength member disposed within the elongated passageway of the hollow central member.

7. The fiber optic cable of claim 2 further including at least one elongated strength member disposed between the hollow central member and said plastic jacket.

* * * * *